Dec. 25, 1928.

S. FLAM 1,696,756

MULTIPLE MOLD

Filed April 26, 1926

INVENTOR
Stephen Flam
BY John Flam
HIS ATTORNEY

Dec. 25, 1928.

S. FLAM 1,696,756

MULTIPLE MOLD

Filed April 26, 1926

INVENTOR
Stephen Flam
BY John Flam
HIS ATTORNEY

Dec. 25, 1928.
S. FLAM
1,696,756
MULTIPLE MOLD
Filed April 26, 1926   3 Sheets-Sheet 3
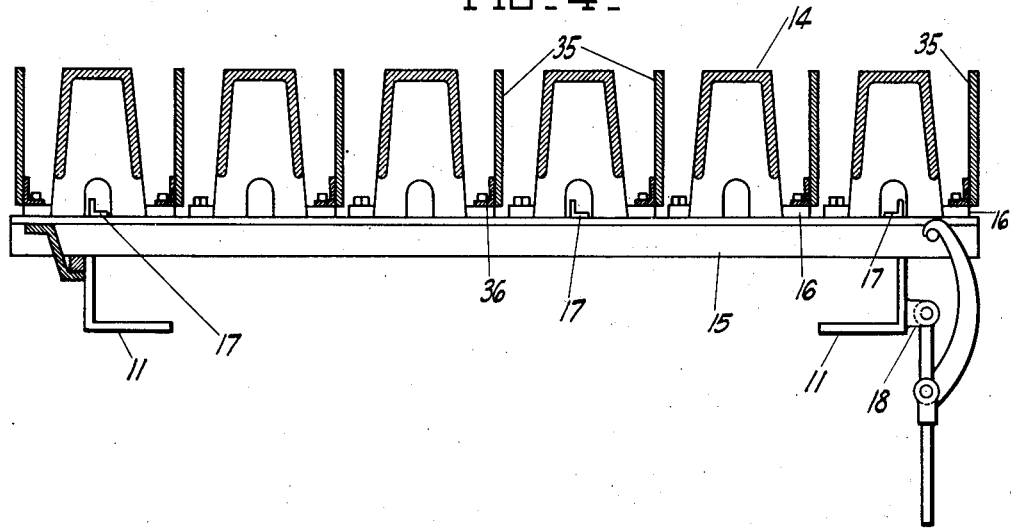
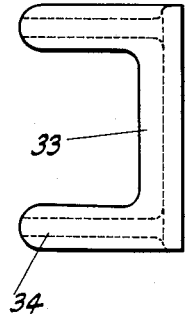
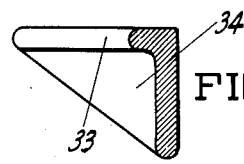
INVENTOR
Stephen Flam
BY John Flam
HIS ATTORNEY Patented Dec. 25, 1928.

1,696,756

UNITED STATES PATENT OFFICE.

STEPHEN FLAM, OF WALNUT PARK, CALIFORNIA, ASSIGNOR TO SUPERTILE MACHINERY CORPORATION, OF LOS ANGELES, CALIFORNIA, A CORPORATION OF CALIFORNIA.

MULTIPLE MOLD.

Application filed April 26, 1926. Serial No. 104,719.

This invention relates to the art of molding plastic material such as concrete, cement, or the like, and more particularly it relates to the manufacture of artificial stone products adapted for building material, pipes, conduits or the like.

In a prior application filed Feb. 19, 1925, in my name entitled: "Process and apparatus for molding" and having Serial Number 10,265, I describe a system whereby articles, such as building blocks with cored holes therein, can be expeditiously molded by the aid of multiple molds. These molds are shown as having a series of apertures in the bottom plate thereof, through which cores are projected. In accordance with that system, a nest of cores is carried by a vertically movable platform with the axes of the cores vertical; and the multiple mold nests over the cores and likewise rests upon the vertically movable structure. After filling the molds, the vertically movable structure is lowered so as to deposit the mold in a curing space, while simultaneously, the cores are also withdrawn by this vertical movement. All this is described and claimed in the application above identified.

It is evident that a single nest of cores can be used in succession with any number of molds, since these cores are removed immediately after the filled molds are left for curing; and for this purpose of course the core structure is independently transportable with regard to the mold structure. By this means, a large economy can be effected, saving duplication of the core structure. It is one of the objects of my present invention to effect a still greater economy, by so arranging matters that at least a part of the mold structure is also removable with the cores. In this manner, only a relatively small portion of the mold equipment, which is essential to support the cast material while setting, need be duplicated; and a large portion can be used over and over again without waiting for the material to set. Of course, the plastic material is purposely made of such character that the removal of these portions does not tend to cause it to slump materially.

I effect these beneficial results by the use of separating plates for the mold spaces, which plates, as well as the cores, are on a common support and are vertically movable through appropriate apertures in the bottom plate of the mold structure. It is thus another object of my invention to provide independently movable structures for different portions of the mold, whereby a part of the mold can be used in succession with any number of structures each incorporating the remaining part of the mold.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Fig. 4 is a sectional view of the other portion of the mold structure and the core structure, taken along plane 4—4 of Fig. 1, this sectional view also indicating the supporting movable framework; and Figs. 5 and 6 are respectively a detail plan and section of an element utilized in connection with the mold structure.

Figure 1:
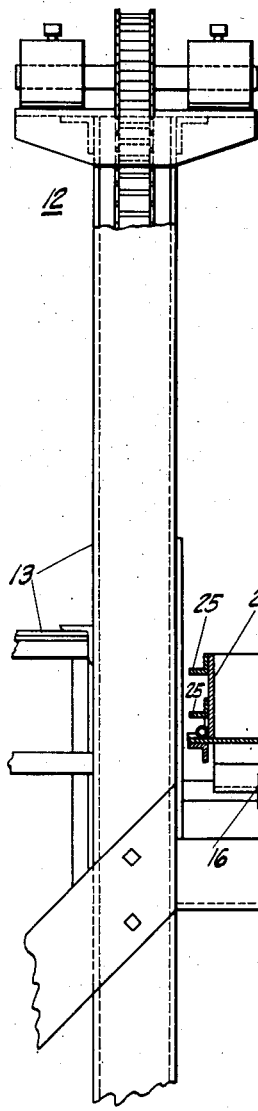
Figure 1 is a view showing a portion of the movable structure upon which the mold can be supported, with a sectional view of a mold resting thereon and constructed in accordance with my invention, as well as a view of the core structure adapted to cooperate therewith, a portion of the mold structure being omitted in order to expose the parts.

The platform upon which the mold pallets and cores are supported is illustrated mainly in a diagrammatic fashion, since it may be substantially identical in structure and use with that disclosed in my earlier application. There are two angle iron supports 11 (Figs. 1 and 4) fastened to a moving chain mechanism which is illustrated partially at 12, near the top of Fig. 1. The structural iron elements 13, forming a general support, are components of a movable truck structure, whereby the molds may be transported to a filling station and later to a curing space, where the supports 11 can be lowered so as to deposit the cast products and the pallet on which they rest, and simultaneously to withdraw the cores and a portion of the mold structure.

The cores 14 are arranged in this instance in four regular rows of six each, and are supported on a grid-like structure in turn detachably secured to the angles 11. This grid-like structure includes a series of longitudinally extending angle irons 15, to which the cores are fastened in any appropriate manner, by the aid of the feet 16. A series of transverse angles 17 (Fig. 4) is fastened to the horizontal legs of irons 15. These angles 17 pass through the lower portions of some of the cores 14 which form transverse rows. In this manner a rigid grid structure is formed for supporting the cores. A catch mechanism shown at 18 serves to hold the grid structure 15—17 in place on the angles 11, and is in all respects similar to that disclosed in my earlier application.

In order to form a multiple mold, a pallet or bottom plate 19 is utilized, having a series of apertures 20 corresponding in spacing and size with the cores 14. This plate is independently removable, and in fact, after the product is molded by the aid of my mechanism, the plate is deposited while some of the other parts of the mold, as well as the cores, are lowered free of the plate. In the present case, the pallet 19 and the sides 21, with appropriate supports, form the independently transportable structure.

The pallet 19 has at the bottom of each of its longitudinal edges, a stiffening angle 22, with its vertical leg extending below the plate 19. It also has a central stiffening channel 23. The side plates 21 are each stiffened with a pair of longitudinal angles 25, and are hinged at their lower edges to the plate 19, as by a plurality of butt hinges 26. Those reinforcing elements which are fastened to the bottom of plate or pallet 19 (which consist of the channel 23 and the angles 22) are extended a short distance beyond the plate and are connected by the angles 24, which can serve conveniently as handles for the structure. In order to hold the hinged sides 21 in proper position to form the box-like structure illustrated in Figs. 2 and 3, hooks 30 are used. These hooks can be anchored conveniently in angles 24, and can have their hooked ends engaging pins 29 extending between the stiffener bars 25. Stop pins 27 projecting above the pallet 19 serve to hold the sides 21 in proper spaced position. It is evident that in this manner, the mold structure can be opened by releasing the hooks, thus permitting sides 21 to assume a position substantially in a horizontal plane, and away from plate 19.

In order to divide the mold space into a plurality of individual compartments, separating plates must be used in the rectangular space provided by the pallet 19, and the sides 21. There is, accordingly, a vertical partition wall 31 which is fastened to the pallet 19, and which extends centrally and longitudinally thereof. This provides a pair of longitudinally extending spaces which can be further separated by a series of transverse plates. In order to permit the mold structure as thus far described to be independently removable with respect to these separating plates, a series of transverse slots 32 is provided in each of the longitudinal spaces, through which the separating plates can enter. Furthermore, to stiffen the structure, stiffener elements 33 are provided adjacent the inner core holes 20, and on the bottom of the pallet 19. One of these elements is shown in detail in Figs. 5 and 6. They may conveniently be cast, in a form adapting them to extend at least partly around the core holes 20, thereby having a U-shaped configuration. Vertical webs 34 can be provided to strengthen the structure.

The separating plates are shown at 35, Fig. 4, and can be held to the core structure by the aid of small angles 36. These angles can be placed over the feet 16 of the cores 14, and can be fastened by the same bolts that hold the cores 14, to the grid structure formed by angle irons 15.

Figures 2, 3:
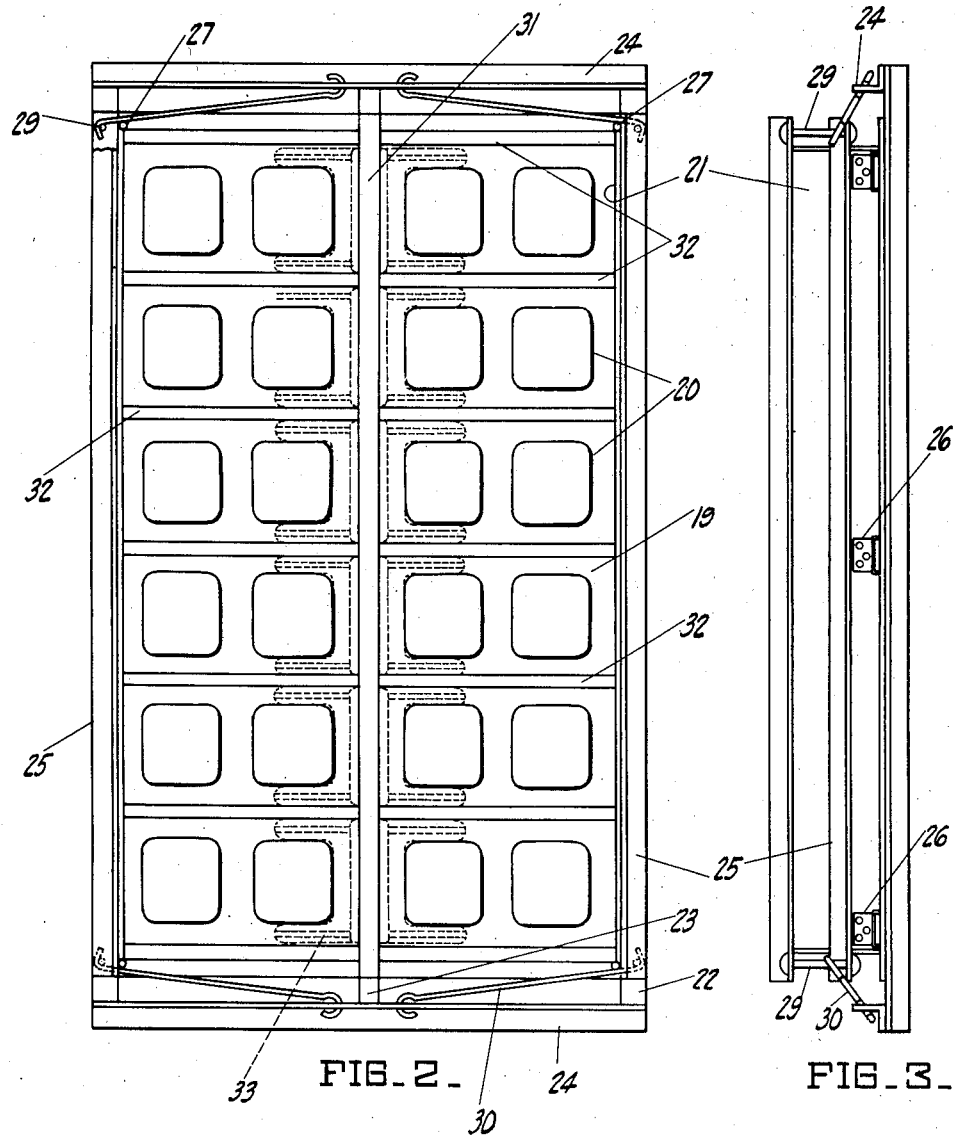
Fig. 2 is a plan view of one portion of the mold structure.
Fig. 3 is a side elevation thereof.

The structural features have now been described. There remains to be set forth a brief description of the mode of operation. First of all, a nest of cores and separating plates of the desired size is fastened to the vertically adjustable supports 11. These are retained in place and changed only when the size of the blocks is changed. Next a pallet 19 and its associated sides 21 in the closed position of Fig. 2, is placed over the cores 14, the plates 35 simultaneously being projected through the slots 32. This condition is shown in Fig. 1; but in this figure, the end separating plates 35 are omitted to make it possible to show the mold section in a clear manner. The mold spaces (twelve in this instance) are then filled with the plastic material. The filled mold is next transported to a rack, where the angles 11 are moved to a level corresponding with the supports of the rack upon which the pallet 19 and the molded products thereon are to be deposited. The movable truck 12—13 is then moved into such relation with respect to the rack that the longitudinal edges of pallet 19 are immediately above the racks. The angles 11 can then be lowered. The first part of the lowering movement causes the pallet 19 to rest on the racks; then continued movement downward serves not only to remove the cores, but also all of the separating plates 35.

The cores and separating plates can be immediately used in connection with another pallet 19, and the operation repeated in connection with another rack. As disclosed in my prior application, a series of vertically arranged racks can be used, to stack the loaded pallets in a vertical row or in a series of vertical rows, whereby after curing, all of the pallets in a series can be simultaneously removed from the racks and unloaded by opening the sides 21.

The fact that one set of the separating plates 35 can be used with any number of pallets 19 makes it possible to prevent duplication of these parts, as was necessary in my prior system. Furthermore, as the plates 35 are moved downwardly, and away from the molded articles, they have a trowelling effect thereon, so that the sides of the finished block are left comparatively uniform and true.

I claim:

1. In combination, a portable vertically movable support, an apertured bottom plate supported thereon and capable of removal by relative movement between it and the support, and separating plates fastened to the support and arranged to project through the apertures in the bottom plate to form mold spaces.

2. In combination, a portable vertically movable support, an apertured bottom plate supported thereon and capable of removal by relative movement between it and the support, and means fastened to the support cooperating with the plate to form mold spaces and cores therein, and arranged to project through the apertures in the bottom plate.

3. In a system for molding objects from plastic material, a vertically movable support, a bottom plate resting on said support and having a series of slots therein, a series of separating plates fastened to said support and arranged to be projected through said slots and to form unit mold compartments.

4. In combination, a vertically movable support, a series of vertical separating plates fastened to said support, a bottom plate apertured so as to fit over the separating plates and to rest on the support, and detachable sides for said bottom plate.

5. In combination, a vertically movable support, an apertured bottom plate resting on said support, a pair of detachable side members for the plate, and a series of cores and separating plates fastened to said support, said cores and separating plates being capable of projection through the apertures of the bottom plate to form a series of mold compartments therewith.

In testimony whereof I have hereunto set my hand.

STEPHEN FLAM.